US007718747B2

(12) United States Patent
Alvares et al.

(10) Patent No.: US 7,718,747 B2
(45) Date of Patent: May 18, 2010

(54) FIBER AND PROCESS FOR OBTAINING SAME FROM HIGH-MODULUS, EXTRUDABLE POLYETHYLENE

(75) Inventors: Dellyo Ricardo dos Santos Alvares, Rio de Janeiro (BR); Roberto Barcala Haag, Rio de Janeiro (BR)

(73) Assignee: Petroleo Brasileiro S.A.-Petrobras, Rio De Janeiro (BR)

( * ) Notice: Subject to any disclaimer, the term of this patent is extended or adjusted under 35 U.S.C. 154(b) by 303 days.

(21) Appl. No.: 11/970,183

(22) Filed: Jan. 7, 2008

(65) Prior Publication Data

US 2008/0108764 A1 May 8, 2008

Related U.S. Application Data

(62) Division of application No. 10/954,215, filed on Oct. 1, 2004, now Pat. No. 7,435,370.

(30) Foreign Application Priority Data

Oct. 3, 2003 (BR) .................................. 0304322

(51) Int. Cl.
*D01F 6/04* (2006.01)
*D01F 6/30* (2006.01)

(52) U.S. Cl. ................. 526/348.1; 526/352; 526/124.3; 526/124.5; 428/359; 428/364; 428/401

(58) Field of Classification Search ................. 428/359, 428/364, 401; 526/348.1, 352, 124.3, 124.5
See application file for complete search history.

(56) References Cited

U.S. PATENT DOCUMENTS

| | | | | |
|---|---|---|---|---|
| 4,344,908 | A | 8/1982 | Smith et al. | |
| 4,413,110 | A * | 11/1983 | Kavesh et al. | 526/348.1 |
| 4,504,432 | A * | 3/1985 | Kamei et al. | 264/177.13 |
| 5,176,862 | A | 1/1993 | Hogenboom et al. | |
| 5,246,657 | A | 9/1993 | Yagi et al. | |
| 5,256,358 | A | 10/1993 | Shiraki et al. | |
| 5,399,195 | A | 3/1995 | Hansen et al. | |
| 6,018,006 | A * | 1/2000 | Abarca et al. | 526/124.5 |
| 6,133,188 | A | 10/2000 | Abarca et al. | |
| 6,183,834 | B1 | 2/2001 | van der Loo | |

* cited by examiner

*Primary Examiner*—Roberto Rábago
(74) *Attorney, Agent, or Firm*—Sughrue Mion, PLLC

(57) ABSTRACT

A fiber and a process for obtaining same from a high-modulus polyethylene, extrudable in state-of-the-art equipment and in the absence of previous solubilization in any kind of organic solvent is described, the process comprising providing such a polyethylene, introducing it in a state-of-the-art extruder, extruding it according to a temperature pattern, obtaining an extrudate that is directed to a cooling bath to have its temperature reduced, then directing the extrudate to a first stretcher where it is stretched or drawn into a fiber of improved tenacity, at a first velocity $v_1$, then heating the fiber at nearly 90° C. and then directing said fiber to a second stretcher to be drawn at a final velocity $v_2$, wherein $v_1<v_2$, at a draw ratio of 2/1 until 65/1. The tenacity of the polyethylene fiber obtained by the said process attains at least 4 gf/den, which makes it useful to naval and offshore applications.

3 Claims, 1 Drawing Sheet

FIBER AND PROCESS FOR OBTAINING SAME FROM HIGH-MODULUS, EXTRUDABLE POLYETHYLENE

This is a divisional of application Ser. No. 10/954,215 filed Oct. 1, 2004, now U.S. Pat. No. 7,435,370. The entire disclosure of the prior application, application Ser. No. 10/954,215, now U.S. Pat. No. 7,435,370, is hereby incorporated by reference.

FIELD OF THE INVENTION

The present invention relates to a fiber and to a process for obtaining same from high-modulus, extrudable polyethylene through the extrusion of said polyethylene in the absence of any added organic solvents. More specifically, the process for obtaining the said fiber comprises melting and stretching in state-of-the-art equipment a polyethylene obtained through ethylene polymerization in the presence of a Ziegler-Natta catalyst on a mixed alumina-magnesium chloride support where the magnesium chloride amounts vary between 15% and 60% by weight, and the $H_2$/ethylene ratio, between 6.0 and 1.2, the variation of these two parameters leading to polyethylene grades having different molecular weight ($M_w$) distributions, especially the amount of $10^5>M_w<10^6$ and $M_w>10^6$ fractions, and different melt indices $MI_{21}$. Grades having $MI_{21}$ melt index (test at 21.6 kg) in the range of 0.5 to 8.0 g/10 min are able to be processed into high modulus fibers.

BACKGROUND INFORMATION

The preparation of polyethylenes having specific properties through high-activity Ziegler-Natta catalyst systems has been the object of several publications.

Particularly, Brazilian patent PI BR 8005670 of the Applicant and fully incorporated herein as reference teaches the preparation of a catalyst support based on a high surface area and pore volume alumina that allows ethylene polymerization to reach extremely high molecular weights. The preparation of the alumina used as catalyst support comprises calcining an ammonium dawsonite, (dawsonite is a basic aluminum and ammonium carbonate) at temperatures between 350° C. and 750° C. Said dawsonite is prepared through reaction between ammonium bicarbonate and aluminum sulfate or nitrate, in the presence of ammonium hydroxide followed by precipitation.

The so-obtained alumina has a high pore volume while combining high surface area and high purity. As is known by the experts, for Ziegler-Natta catalysts, features such as specific area, pore dimension and pore volume distribution in alumina are deeply linked to the catalytic activity of these particles. Alumina as described in the cited PI BR 8005302 has pore volume in excess of 1.0 $cm^3$ μg and surface area between 200 $m^2$/g and 500 $m^2$/g.

The so-prepared alumina was used by the Applicant in the development of several processes for preparing polyethylene of varying characteristics, including ultra-high molecular weight polyethylene, a polymer the molecular weight $M_w$ of which is higher than $10^6$ and $MI_{21}$ is zero.

Thus, U.S. Pat. No. 6,018,006 and U.S. Pat. No. 6,133,188 (corresponding to Brazilian patents PI BR 8703935 and PI BR 8801441) of the Applicant and equally fully incorporated herein by reference teach ethylene polymerization in the presence of a catalyst based on the above-described alumina and between 15% and 85% by weight magnesium chloride previously treated with ethyl benzoate, followed by impregnation with of from 1.3% to 2.0% by weight of titanium tetrachloride. The process also involves a triethyl aluminum (TEA) co-catalyst at a Al/Ti molar ratio of from 40/1 to 100/1. Pressure levels are 3 bar hydrogen and 6 bar ethylene, at temperatures between 80° C. and 90° C., during one hour or more. The molecular weight distribution (Mw) of the obtained polyethylene products is in the range of 3.5 to 6.5% by weight of the total chains having $M_w$ higher than $10^6$ and from 35 to 55% by weight of the total chains having $M_w$ between $10^5$ and $10^6$, with $MI_2$, between 0.32 and 0.10 g/10 minutes.

In spite of the improvement brought about by the above-described technology, and linked to the possibility of varying the molecular weight of polyethylene products by varying the amount of magnesium chloride in the mixed support, it is not possible to find in the above patents the slightest awareness that by varying the ethylene/hydrogen ratio, besides the adjustment of further process conditions, it is possible to obtain new, not yet predicted materials, such as the polyethylene fibers that constitute the object of the present invention.

This is because the ethylene polymerization technology taught in the above patents does not contemplate the ethylene polymerization process conditions in terms of ethylene/hydrogen ratio leading to polyethylene grades endowed with mechanical properties that involve high modulus, while at the same time being extrudable into filaments or fibers, that is, products that can be extruded in conventional extruders, dispensing with the use of solvents as in the gel spinning process used for producing ultra-high molecular weight polyethylene fibers.

On the other hand, the manufacture of naval and offshore cables is of paramount importance in the petroleum industry. Presently used, polyester cables do not float in water, this being a drawback to the user.

In principle, it is possible to shift this manufacture to olefin polymers, such as polyethylene, the density of which is lower than that of water. However, since mechanical properties involve high modulus features, only ultra high molecular weight polymers can be used, this implying in processing such polyethylene through gel spinning processes.

Gel spinning involves dissolving the polymer resin in an organic solvent such as decalin, a toxic and expensive product, and then processing the obtained solution into a fiber, with solvent evaporation/recovery. The overall process is of high cost and requires special measures related to hazards to humans and the environment caused by the solvents used.

The gel spinning process is generally described in U.S. Pat. No. 4,344,908, where it is taught a process for making polymer filaments of high tensile strength and high modulus through stretching of a polymer filament containing a substantial amount, at least 25 wt %, of a solvent for the polymer at a temperature between the polymer swelling and melting points. This technology uses polymer filaments of various kinds, including polyolefins, of high and ultra high molecular weight, without specifying the kind of polyolefin or the preparation of a specific polyolefin.

U.S. Pat. No. 5,256,358 describes a method for preparing filaments from a commercial, ultra-high molecular weight polyethylene through extrusion and stretching. Based on a polyethylene of intrinsic viscosity of at least 3.5 dl/g, filaments are obtained having outer diameter between 0.1 and up to 10 mm and tensile strength of up to 100 kg/$mm^2$. Also described is an extruder having a grooved cylinder having an extrusion orifice of L/D ratio of up to 100, such equipment allowing the extrusion of the polyethylene as threads or filaments. After extrusion, the polymer is drawn or stretched at draw ratios between 1.2/1.0 and 30/1, and the polymer is obtained as filaments. The polyethylene useful for the purposes of said patent is a commercial, ultra-high molecular weight polyethylene having intrinsic viscosity of up to 16.5 dl/g, melt index lower than 0.01 g/10 minutes, melting point 136° C. and bulk density 0.45 g/cm$^3$.

U.S. Pat. No. 5,256,358 describes therefore a non-conventional extrusion equipment as well as a processing method that make possible to process ultra-high molecular weight polyethylene commercial samples into threads or extrudable filaments, having a diameter of up to 10 mm. The obtained filaments are not exactly fibers, that normally have a lower diameter and where the tensile strength is expressed in linear density (tenacity). There is not, in this patent, any mention to typical fiber properties, such as linear density (denier) and tenacity.

U.S. Pat. No. 5,246,657 teaches a process for obtaining ultra-high molecular weight polyethylene fibers from a mixture of two olefin resins, one of them being polyethylene and the other one, a copolymer of PE and PP, in the presence of a wax diluent to facilitate extrusion. The polyolefin mixture is extruded and stretched at a draw ratio of at least 10.

U.S. Pat. No. 5,176,862 owned by DSM, a company with expertise in PE fibers for offshore applications, describes cables where the polymer obtained by gel spinning has been stretched in order to improve the mechanical properties.

U.S. Pat. No. 6,183,834 also owned by DSM describes a series of parameters for the PE fibers in terms of tensile strength and denier number by filament. This company uses gel spinning only for polyethylene spinning.

In the article by Roerdink, E and van Dingenen, J.—"Past and Future of High Performance Fibres", Polymer Fibres 2002, 10-12 Jul. 2002, The Manchester Conference Centre, UMIST, Manchester, UK FIG. 1 shows tenacity values for several materials, beginning with the textiles that reach values in the range of 5.0 gf/den, carpets and hoses with values up to 10, and materials of the class of ropes, composites, ballistic and aerospace industry materials in the range of 20 and up to 40 gf/den. However, according to the caption of this FIGURE, there is a gap in tenacity values in the range between 10 and 20 gf/den, such range being advantageously covered by the fiber materials of the invention, as will readily be seen hereinbelow.

Thus, on the one hand, the literature points out the polyethylene production technology yielding products of acceptable mechanical properties but which do not necessarily render these polyethylene products suitable for fiber manufacture and on the other hand, the polyethylene fiber production technology based on ultra-high molecular weight materials that can be extruded only when dissolved in organic solvents according to the gel spinning process.

Therefore, the technique still needs a process for obtaining fibers from high-modulus, extrudable polyethylene by extrusion and stretching in state-of-the-art equipment, where said polyethylene is obtained by an ethylene polymerization process where the control of the ethylene/hydrogen ratio during polymerization as well as process features such as the catalyst being supported on varying amounts of mixed alumina and magnesium chloride lead to polyethylene grades having such a molecular weight distribution Mw and melt index $MI_{21}$ values typical of high-modulus materials that are at the same time extrudable into fibers in the absence of any added solvents, such fibers and process for obtaining same being described and claimed in the present invention.

SUMMARY OF THE INVENTION

Thus, broadly the present invention deals with fibers and a process for obtaining same from high-modulus, extrudable polyethylene by extrusion and stretching in state-of-the-art equipment, in the absence of any added solvents, said polyethylene having tensile strength of at least 250 kgf/cm$^2$. Such polyethylene is obtained by ethylene polymerization in the presence of a catalyst prepared from alumina admixed with magnesium chloride amounts between 15% and 60% by mass based on the total support mass, and where the ethylene/hydrogen ratio varies between 6.0 and 1.2, the variation of these two parameters leading to polyethylene grades having different molecular weight Mw distributions, especially the amount of $10^5>M_w<10^6$ and $M_w>10^6$ fractions, and, consequently, having different melt indices. Grades having melt index $MI_{21}$ values in the range of 0.5 to 8.0 g/10 min are suitable for being processed into fibers useful in the naval and offshore industry.

Thus, the process for obtaining the fibers from high-modulus, extrudable polyethylene according to the invention comprises the following steps:

a) Providing a high-modulus, extrudable polyethylene having tensile strength of at least 250 kgf/cm$^2$, obtained by ethylene polymerization in the presence of a Ziegler-type catalyst on a mixed alumina-magnesium chloride support;

b) Introducing said polyethylene into a state-of-the-art extruder 1 to melt such polyethylene under extrusion conditions and obtain an extrudate that is directed to a cooling bath 2 to be cooled;

c) directing the so-cooled extrudate to a first stretcher 3 to be stretched or drawn into a fiber that has its tenacity improved, the stretching being carried at a first velocity $v_1$;

d) directing said fiber to a heating bath 4 at a temperature around 90° C. and then to a second stretcher 5 to further increase the fiber tenacity by stretching or drawing, said second stretching being carried out at a final velocity $v_2$, wherein the stretching conditions involve:

i) $v_1<v_2$; and ii) The draw ratio between the first stretcher 3 and the second stretcher 5 being between 2/1 and up to 65/1; and e) Recovering the product fiber from high-modulus polyethylene.

Further, the invention relates to so-obtained polyethylene fibers.

Therefore the invention provides a process for obtaining fibers from high-modulus, extrudable polyethylene by extrusion and stretching of said extrudable polyethylene in state-of-the-art equipment.

The invention also provides a process for obtaining fibers from high-modulus, extrudable polyethylene that dispenses with the previous dissolution of the polyethylene in any kind of organic solvent.

The invention also provides a process for obtaining fibers from high-modulus, extrudable polyethylene, said polyethylene being obtained by ethylene polymerization in the presence of a catalyst based on a mixed alumina and magnesium chloride support in amounts between 15% and 60% by mass, and where the ethylene/hydrogen ratio varies between 6.0 and 1.2.

The invention provides further the fibers from said high-modulus polyethylene, useful for offshore applications.

DETAILED DESCRIPTION OF THE PREFERRED MODES

Figure 1:
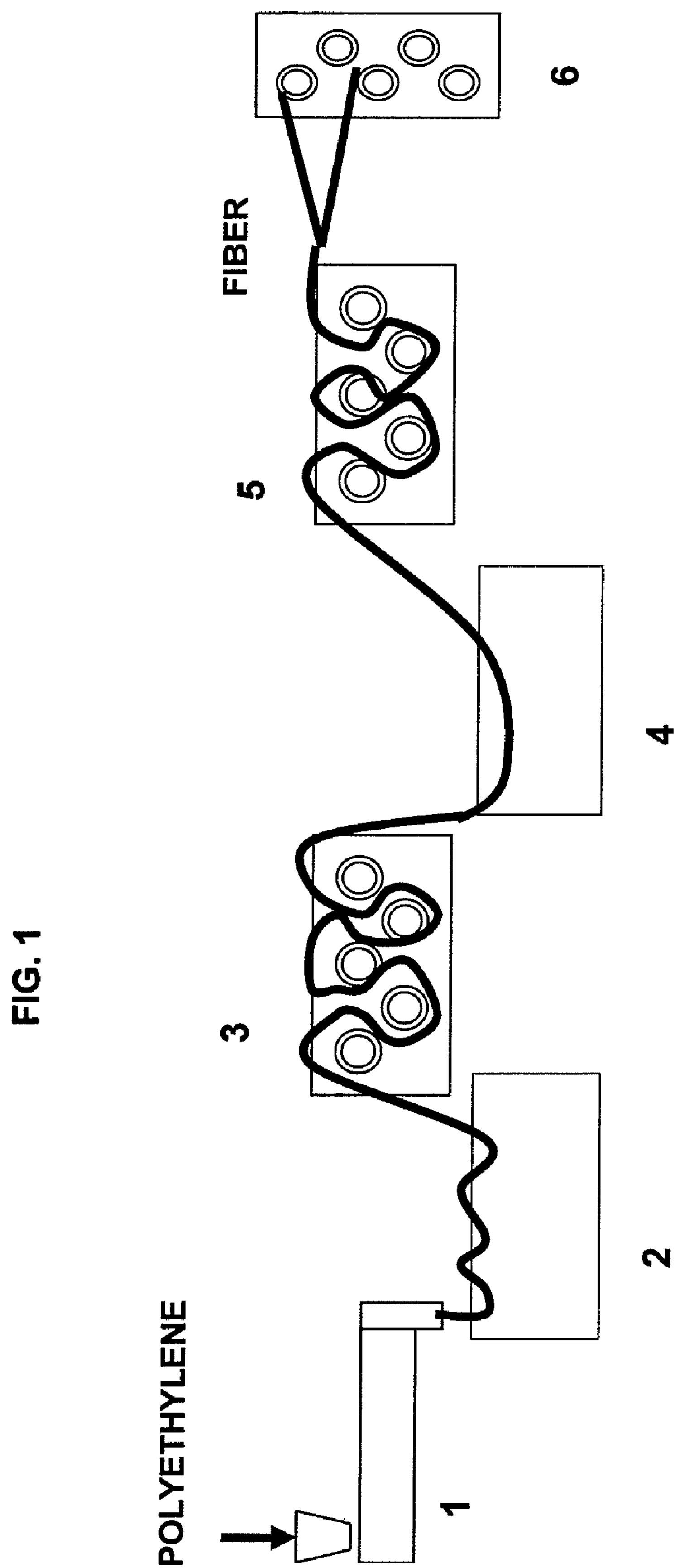
FIG. 1 attached is a flowsheet of the extrusion and stretching system adopted for obtaining fibers according to the invention.

One aspect of the present invention is a process for obtaining fibers from high-modulus, extrudable polyethylene through extrusion and stretching in state-of-the-art equipment.

The polyethylene useful for the process for obtaining fibers according to the invention should have tensile strength of at least 250 kgf/cm$^2$.

A flowsheet of the extrusion process is shown in FIG. 1.

The polyethylene fibers of the invention are prepared by polyethylene processing, in the absence of any added organic solvent, in state-of-the-art polyethylene processing equipment.

One useful equipment is a Brabender double screw extruder, with a temperature profile of 160-180-200-200° C.

Alternatively, a Haake extruder can be used, at a temperature profile of 150-240-280-295-290° C., screw velocity from 25 to 50 RPM, and orifice diameter 2.0 mm.

Still alternatively, an industrial extruder can be used having a temperature profile of 223-288-309-258-289° C., screw velocity 35.9 RPM, and orifice diameter 1.2 mm.

According to FIG. 1, the polyethylene resin is introduced in a state-of-the-art extruder 1 and after the extrusion carried out under the conditions outlined above, an extrudate is obtained.

The extruded polyethylene or extrudate is then submitted to a stretching step.

In a more detailed way, according to FIG. 1, the process for obtaining the fiber from a high-modulus polyethylene comprises introducing the polymer into a state-of-the-art extruder 1, and extruding said polyethylene under the extrusion conditions outlined above so as to obtain an extrudate.

The so-obtained extrudate is then directed to a cooling bath 2 to be cooled, and once cooled, the same is directed to a first stretcher 3 to be stretched or drawn at a first velocity $v_1$ so as to obtain a fiber. The fiber is then heated in a heating bath 4 at a temperature close to 90° C. and then directed to a second stretcher 5 where it is stretched or drawn at a final velocity $v_2$, where $v_1 < v_2$. At the outlet of stretcher 5 the final fiber is recovered. In stretchers 3 and 5 the fiber tenacity is increased.

The ratio between the $v_1$ and $v_2$ velocities defines the so-called draw ratio. For the purposes of the invention, useful draw ratio values extend over a wide range, from values as low as 2/1 and up to 65/1, according to the particular features of the extruded material. Typical values are between 4/1 to 20/1.

The purpose of the stretching is to cause orientation of the macromolecules' chains, this leading to a rise in fiber tenacity.

The different stretching velocities $v_1$ and $v_2$ as well as the intermediate thermal treatment in heating bath 4 contribute to the tenacity rise caused by stretching and chain orientation, this rising the fiber tenacity.

The heating step close to 90° C. in heating bath 4 to which is submitted the fiber between the two stretching steps is designed to provide an accommodation of the partially oriented chains.

The fiber product leaving stretchers 3 and 5 is stored in reels 6.

Process conditions data, molecular weight figures, polymer mechanical properties and polymer processing features are listed in Table 1 below.

From these data it can be observed that a wide variety of polyethylene grades can be obtained, in terms of mechanical properties as well as of processing features.

The process according to the invention for obtaining fibers from a high-modulus, extrudable polyethylene is based on a Ziegler-type polymerization process where ethylene is polymerized under low-pressure conditions, in the presence of a catalyst prepared according to the teachings of the above-cited U.S. Pat. No. 6,018,006 and U.S. Pat. No. 6,133,188.

Additionally, the ethylene/$H_2$ ratio is varied between 1.2 and 6.0.

According to said proprietary process, at first the ammonium dawsonite precursor of the alumina support is prepared.

To this purpose, an ammonium bicarbonate buffer solution at pH 8.0 and concentration 23% by mass is slowly added to a 25% by mass aluminum sulfate solution, the pH being kept between 7.5 and 7.7 by means of a 1:1 ammonium hydroxide solution. As a general rule, the molar ratio of ammonium bicarbonate and aluminum sulfate is between 3.0 and 4.0. As a result, a basic aluminum and ammonium carbonate is obtained. The same compound can be also obtained through a variable pH process, without the addition of ammonium hydroxide to control pH. The gel-like precipitate is separated by filtration and washed with deionized water in order to be dried at 120° C. and calcined at several temperatures, yielding then a gamma-alumina.

For the purpose of obtaining polyethylene products useful for the fibers of the invention, the following calcination conditions were used: a fixed, horizontal bed; period, from 4 to 7 hours; temperature between 600° C. to 600° C., under a slight flow of an inert gas such as argon.

The alumina support pore volume and BET surface area properties are between 0.5 cm$^3$/g and 1.5 cm$^3$/g and 200 m$^2$/g and 400 m$^2$/g, respectively.

In order to prepare the mixed magnesium chloride-alumina support, the following steps are required:

a) Activating magnesium chloride by milling in a ball mill with 10% by mass of ethyl benzoate under an inert atmosphere, at ambient temperature, during ca. 48 hours;

b) Calcining alumina of surface area 200-400 m$^2$/g and pore volume between 0.5-1.5 cm$^3$/g at 600-800° C. during 4 to 7 hours;

c) Thoroughly mixing the so-activated magnesium chloride in an amount between 15% and 60% by mass based on the total support mass to the alumina of b) in a ball mill at ambient temperature, for ca. 2 hours, under an inert atmosphere, yielding the mixed magnesium chloride-alumina support.

For impregnating the so-prepared support with titanium tetrachloride $TiCl_4$, a support suspension in 5 to 7.5 times by volume/$TiCl_4$ mass is prepared so that the final Ti content deposited is between 1.0 and 2.0 by mass based on the total mass. The excess $TiCl_4$ is washed off with n-hexane at 60° C.

The ethylene polymerization reaction is carried out in a 4-liter capacity Parr reaction vessel containing an inert diluent such as n-hexane, a co-catalyst such as triethyl aluminum (TEA) or triisobutyl aluminum (TIBA), at Al/Ti ratios of from 10/1 up to 100/1 or 40/1 up to 100/1 respectively. Ethylene pressure varies between 6 and 8 bar while the $H_2$ pressure varies between 1.5 and 5 bar, so that the ethylene/$H_2$ ratio varies between 6.0 and 1.2. The temperature is kept between 75-95° C. for one hour.

After the end of the reaction the pressure in the reaction vessel is alleviated and the polymer is recovered as a n-hexane-suspended powder that is then decanted and oven-dried.

In an unexpected, not described nor suggested way, the Applicant found that not only the variation of the $MgCl_2$ amount in the $MgCl_2$/alumina mixture but also the variation of the ethylene/$H_2$ ratio influence the molecular weight distribution $M_w$, so that some polyethylene grades have high-modulus features while at the same time being extrudable in state-of-the-art equipment, being thus useful for the preparation of fibers designed for offshore applications.

The mechanical properties of the so-obtained polyethylenes are assessed through the usual methods.

The properties of tensile strength (ASTM Method D-638) and Izod impact test (ASTM Method D-256) are nearly always in the range typical for ultra-high molecular weight polyethylene.

For all specimen samples, Rockwell Hardness figures (ASTM D-785) are between 75 and 80 in the R scale, while Taber Abrasion in mg/1000 rotations is between 35 and 40, which are again figures typical for ultra-high molecular weight polyethylene.

The $MI_{21}$ (ASTM D-1238) test assesses, for the tested polymer under a mass of 21.6 kg, the melt flow index in g/10 minutes.

In view of the various possible amounts of magnesium chloride in the support, with the consequent molecular weight variation, different polyethylene grades are obtained, so that $MI_{21}$ can vary, according to the invention, of from 0.5 up to 6.0 and even 8.0 g/10 minutes. The preparation of one or other grade will depend exclusively on the desired application of the end product.

As will be seen below in the present specification, it is found that some specific grades, for example, two grades having $MI_{21}$ of 1.6 and 0.9 g/10 minutes, are suitable for being processed into high-modulus fibers, having tenacity values that are respectively comparable to those of state-of-the-art polyethylene or polypropylene fibers, to be used in naval applications, or situated between those of polyester fibers and ultra-high molecular weight polyethylene used as offshore cables.

Table 1 below summarizes process variables for the preparation of the catalyst support in terms of magnesium chloride in the overall support, ethylene/hydrogen ratio, properties of the obtained polyethylene as well as the main fiber properties in processing, such as productivity and melt flow index $MI_{21}$.

Data from Table 1 show that the variation in magnesium chloride content in the catalyst support, combined to the variation in the ethylene/$H_2$ ratio, leads to polymers having a wide range of melt indices, as well as to fibers having different tenacity values. The increase in magnesium chloride content in the catalyst support, as well as the decrease in the ethylene/$H_2$ ratio, lead to polymers of higher melt index.

It should be pointed out that the main advantage of the present fiber and process as compared to the state-of-the-art ultra-high molecular weight polyethylene fiber is doubtless the economic aspect, when one considers the high cost of the gel spinning process, not to mention the health and environmental hazard represented by the use of the decalin solvent.

Another aspect of the invention is the polyethylene fiber obtained.

According to the literature, average tenacity figures in cited Examples are 5.0 gf/den for commercial polyethylene and polypropylene, 9.0 gf/den for polyester and 30.0 gf/den for ultra-high molecular weight polyethylene.

One advantage of the present invention is the possibility of obtaining fibers having tenacity values around 14.0 gf/den, this range being unknown in commercial products. Consequently, the fiber product obtained herein leads to a wide range of new, unexplored applications.

It should be understood that the 14.0 gf/den value does not represent the upper tenacity limit allowed by the process for

TABLE 1

| CATALYST | POLYMERIZATION | | MECHANICAL PROPERTIES | | PROCESSING | |
|---|---|---|---|---|---|---|
| | | | TENSILE | IZOD | | |
| $MgCl_2$ % mass | $P_{ET}/PH_2$ | ET/$H_2$ Ratio | STRENGTH (kgf/cm$^2$) | IMPACT[(a)] (kgcm/cm) | PRODUCTIVITY ($g_{POL}$/min)[(c)] | $MI_{21}$[(d)] (g/10 min) |
| 15 | 8/3 | 2.7 | 312 | No[(b)] | 3.9 | 3.0-11.0 |
| | 6/3 | 2.0 | 260 | No | 5.4 | 3.0-11.0 |
| | 8/6 | 1.3 | 249 | 18 | 13.6 | 30.0-40.0 |
| | 6/5 | 1.2 | 252 | 14 | 12.3 | 30.0-40.0 |
| 30 | 6/1 | 6.0 | >300 | No | | 0.1-0.4 |
| | 6/1.5 | 4.0 | >300 | No | | 0.9-1.5 |
| | 6/2 | 3.0 | >300 | No | 5.5 | 2.0-2.6 |
| | 8/3 | 2.7 | 321 | No | 4.9 | |
| | 6/3 | 2.0 | 288 | No | 7.6 | 4.0-6.0 |
| | 8/6 | 1.3 | 242 | 23 | 14.0 | 30.0-40.0 |
| | 6/5 | 1.2 | 300 | 10 | 14.5 | 30.0-40.0 |
| 45 | 8/3 | 2.7 | 320 | No | 6.7 | 3.0-11.0 |
| | 6/3 | 2.0 | 304 | No | 7.8 | 3.0-11.0 |
| | 8/6 | 1.3 | 313 | 13 | 16.7 | 30.0-40.0 |
| | 6/5 | 1.2 | 335 | 13 | 16.3 | 30.0-40.0 |
| 60 | 8/3 | 2.7 | 324 | No | 7.5 | 3.0-11.0 |
| | 6/3 | 2.0 | 300 | No | | 3.0-11.0 |
| | 8/6 | 1.3 | 253 | 12 | 17.4 | 30.0-40.0 |
| | 6/5 | 1.2 | 305 | 9 | 20.2 | 30.0-40.0 |

Notes:
[(a)]IZOD Impact strength
[(b)]No = the test specimen did not break, the values obtained were higher than 90 kgcm/cm.
[(c)]PRODUCTIVITY IN EXTRUSION: double screw Brabender extruder, Haake and industrial extruders
[(d)]$MI_{21}$: polymer melt index under 21.6 kg weight preparing fibers according to the invention, since the operation conditions herein described can be the object of optimizations and improvements in the fiber processing that can lead to higher tenacity values, such as for example 20 gf/den or higher.

Further, it should be stressed the huge industrial applicability of the fiber material thus obtained, when considering the ever-increasing drilling depths attained in the search for oil, such depths rendering unusable polyester cables that are unable to float, while polyethylene cables float well, besides having higher tenacity.

On the other hand, the polyethylene cables obtained using the gel spinning technology have the drawbacks outlined hereinbefore.

The fiber features obtained from some polyethylene grades prepared as taught above, by extrusion and stretching in state-of-the-art equipment are listed in Table 2 below, and can be summarized in the short list below, where denier is defined as the unit of linear density, equal to mass in grams of 9,000 meters of fiber.

denier (den): 400-1700 tenacity: at least 4 gf/den

TABLE 2

| POLYMER | FIBER FEATURES | | |
|---|---|---|---|
| $MI_{21}$© (g/10 min) | DRAW RATIO | DENIER | TENACITY (gf/denier) |
| 0.9 | 8/1 | 430 | 14.0 |
| 0.9 | 10/1 | 450 | 12.0 |
| 1.6 | 8/1 | 1224 | 5.1 |
| | 13/1 | 1170 | 5.5 |
| | 32/1 | 1674 | 3.9 |
| | 64/1 | 1305 | 4.2 |
| 4.0 | 8/1 | 847 | 5.3 |

The present invention will now be illustrated by Examples, that should not be construed as limiting same.

Example 1

To a 4-liter capacity reaction vessel are added 2 liters of n-hexane. The system is heated to 50° C. and then 0.8 mL of a 0.9M triethylaluminum (TEA) solution and 1.8 mL of a suspension of catalyst supported on a mixture of 30% by mass magnesium chloride/70% by mass alumina are added, containing 1.2% by mass titanium. Then, the temperature is raised to 70° C. and hydrogen is introduced at a pressure of 2.0 bar. Ethylene monomer is then continuously fed at a 6.0 bar pressure, for 1 hour. The temperature is raised to 85° C. by the polymerization reaction exotherm and is kept at this level by cooling with external water.

The polyethylene product obtained has the following properties:

Melt flow index $MI_{21}$: 1.6 g/10 min melting point: 135° C.

Vicat softening temperature: 130° C.

specific weight: 0.95 g/cm$^3$ tensile strength: 320 kg/cm$^2$

Izod impact strength: does not break

Taber abrasion: 40 mg/1000 rotations

Rockwell Hardness: 70 R scale

Such polymer is then submitted to extrusion in an industrial, state-of-the-art extruder provided with a head having a orifice diameter of 1.2 mm, screw velocity 35.9 RPM, using as temperature profile 223-288-309-258-289° C. with a productivity of 5.3 g/min. The so-produced extrudates are stretched at a 13/1 draw ratio, with the resulting fibers having 1170 denier and 5.5 gf/den tenacity.

Example 2

A polyethylene prepared as in Example 1 is submitted to extrusion in an industrial, state-of-the-art extruder provided with a head having an orifice diameter of 1.2 mm, screw velocity 35.9 RPM, using as temperature profile 220-230-250-255-260° C., with a productivity of 5.2 g/min. The extrudates are stretched at a 64/1 draw ratio, the fibers having 1305 denier and 4.2 gf/den tenacity.

Example 3

To a 4-liter capacity reaction vessel are added 2 liters of n-hexane. The system is heated to 50° C. and then 1.2 mL of a 0.9M triethylaluminum (TEA) solution and 1.6 mL of a suspension of catalyst supported on a mixture of 30% mass magnesium chloride/70% mass alumina are added, containing 1.5% mass titanium. Then, the temperature is raised to 70° C. and hydrogen is introduced at a pressure of 1.5 bar. Ethylene monomer is then continuously fed at a 6.0 bar pressure, for 1 hour. The temperature is raised to 85° C. by the polymerization reaction exotherm and is kept at this level by cooling with external water.

The polyethylene product obtained has the following properties:

Melt flow index $MI_{21}$: 0.9 g/10 min melting point: 135° C.

Vicat softening temperature: 130° C.

specific weight: 0.95 g/cm$^3$ tensile strength: 380 kg/cm$^2$

Izod impact strength: does not break

Taber abrasion: 40 mg/1000 rotations

Rockwell Hardness: 70 R scale

Such polymer is then submitted to extrusion in an industrial, state-of-the-art Haake extruder provided with a head having a orifice diameter of 2.0 mm, screw velocity 25 RPM, and temperature profile 150-240-280-295-290° C. with a productivity of 5.0 g/min. The so-produced extrudates are stretched at a 8/1 draw ratio, with the resulting fibers having 430 denier and 14.0 gf/den tenacity.

From the obtained data it is concluded that the tenacity levels indicate that the fibers obtained using the inventive process based on the extrudable polyethylene are suitable for offshore applications and therefore are fit to advantageously replace polyester for these applications.

In the same way, the inventive fibers can advantageously replace most of the ultra-high MW polymers that have necessarily to be solubilized in organic, hazardous solvents for processing into fibers.

We claim:

1. A fiber from a high-modulus, extrudable polyethylene, wherein said fiber is obtained according to a process which comprises:

a) providing a high modulus, extrudable polyethylene having tensile strength of at least 250 kgf/cm$^2$ and $MI_{21}$ from 0.5 to 8.0 g/10 mm, said polyethylene being obtained by ethylene polymerization in the presence of a Ziegler-type catalyst on a mixed magnesium chloride-alumina support;

b) directing said polyethylene to an extruder in order to melt same and obtain an extrudate that is directed to a cooling bath to have its temperature reduced;

c) directing said cooled extrudate to a first stretcher and stretching or drawing the cooled extrudate into a fiber, the stretching being carried out at a first velocity $v_1$;

d) directing the so-stretched fiber to a heating bath at a temperature of ca. 90° C.; and e) directing the so-stretched fiber, after heating, to a second stretcher, the stretching being carried out at a velocity $v_2$, and where i) $v_1 < v_2$; and iii) the draw ratio between the first stretcher and the second stretcher is from 2/1 up to 65/1; and f) recovering a fiber, wherein said fiber has linear density values in the range of 400-1700 denier and tenacity of at least 4 gf/den.

2. The fiber according to claim 1, wherein the tenacity of said fiber is 14 gf/den.

3. The fiber according to claim 1, wherein the tenacity of said fiber is 20 gf/den or higher, according to previously designed stretching conditions.

* * * * *